US012628741B2

(12) United States Patent
Kumbhar et al.

(10) Patent No.: US 12,628,741 B2
(45) Date of Patent: May 19, 2026

(54) WINDROWER IMPLEMENT WITH MERGER ATTACHMENT

(71) Applicant: DEERE & COMPANY, Moline, IL (US)

(72) Inventors: Swapnil Kumbhar, Pune (IN); Benjamin M. Lovett, Ottumwa, IA (US); Hunter T. Kelderman, Ottumwa, IA (US); Tyler J. Bouslog, Keota, IA (US)

(73) Assignee: DEERE & COMPANY, Moline, IL (US)

( * ) Notice: Subject to any disclaimer, the term of this patent is extended or adjusted under 35 U.S.C. 154(b) by 540 days.

(21) Appl. No.: 18/192,057

(22) Filed: Mar. 29, 2023

(65) Prior Publication Data

US 2024/0324511 A1 Oct. 3, 2024

(51) Int. Cl.
*A01D 61/02* (2006.01)
*A01D 57/20* (2006.01)

(52) U.S. Cl.
CPC .............. *A01D 61/02* (2013.01); *A01D 57/20* (2013.01)

(58) Field of Classification Search
CPC ......... A01D 61/02; A01D 57/20; A01D 84/00
See application file for complete search history.

(56) References Cited

U.S. PATENT DOCUMENTS

| | | | | |
|---|---|---|---|---|
| 4,910,951 A * | 3/1990 | Reilly | .................... | A01D 57/20 56/376 |
| 7,484,349 B2 | 2/2009 | Talbot et al. | | |
| 7,526,908 B1 | 5/2009 | Rice et al. | | |
| 7,624,561 B2 * | 12/2009 | McLean | ................. | A01D 84/00 56/192 |
| 7,877,975 B2 | 2/2011 | McLean et al. | | |
| 9,736,983 B2 * | 8/2017 | Treffer | ................. | A01D 43/04 |
| 10,485,173 B2 | 11/2019 | Nafziger et al. | | |
| 2007/0068131 A1 * | 3/2007 | Talbot | .................... | A01D 57/20 56/192 |
| 2016/0278284 A1 * | 9/2016 | Rotole | ................. | A01D 41/141 |
| 2018/0132420 A1 * | 5/2018 | Nafziger | ................ | A01D 57/20 |

FOREIGN PATENT DOCUMENTS

CA        2521187 A1     3/2007

* cited by examiner

*Primary Examiner* — Joseph M Rocca
*Assistant Examiner* — Jose Antonio Martinez

(57) ABSTRACT

A windrower implement includes a merger attachment having a support structure rotatably supporting a conveyor, and a lift structure interconnecting the support structure and a frame of the windrower implement. The lift structure is moveable between a deployed position for positioning the conveyor in a lowered and downward inclining operating position, and a stowed position for positioning the conveyor in raised and upward inclining non-operating position. The lift structure includes a link system coupled to the frame and a lift arm coupled to the link system and having a support connection interconnecting the lift arm and the support structure. The support connection maintains a relative position between the lift arm and the support structure during movement of the lift structure between the stowed position and the deployed position.

18 Claims, 11 Drawing Sheets

WINDROWER IMPLEMENT WITH MERGER ATTACHMENT

TECHNICAL FIELD

The disclosure generally relates to a windrower implement having a merger attachment.

BACKGROUND

A windrower implement gathers crop material and forms the crop material into a swath or windrow. Often, the windrower implement may include a mower head that cuts the crop material and discharges the cut crop material rearward. The windrower implement may include a left and right forming board and a swath board for forming the discharged crop material into the windrow that is typically positioned between a pair of front wheels of the windrower implement, along a generally centerline of the windrower implement. Accordingly, a windrow is formed along the general centerline of the windrower implement with each pass through a field.

The windrower implement may be equipped with a merger attachment for conveying the crop material laterally relative to the centerline of the windrower implement. The merger attachment may be coupled to the belly of the windrower implement immediately rearward of the mower head for receiving the cut crop material discharged therefrom. The merger attachment includes a conveyor positioned to rotate in an endless loop generally transverse to the centerline of the windrower implement. The merger implement receives the cut crop material from the mower head, and the conveyor moves the crop material laterally relative to the windrower implement to form the windrow at a position that is laterally offset from the centerline of the windrower implement.

The merger attachment includes a lift system that is operable to position the conveyor in a lowered operating position, and in a raised non-operating position. When disposed in the lowered operating position, an upper or receiving surface of the conveyor should be positioned low or close to the ground for receiving the crop material discharged from the mower head. The closer the receiving surface of the conveyor is to the ground, the more crop material the conveyor may receive and convey or move laterally. When disposed in the raised non-operating position, the conveyor is spaced from the ground surface so that the crop material discharged from the mower head may fall underneath the conveyor. However, if the conveyor is inclined forward and downward along the centerline of the mower implement, then crop material may still accumulate on the upper or receiving surface of the conveyor, even when the disposed in the raised non-operating position. Additionally, it is desirable to maximize rigidity of the lift system in order to reduce or limit flex and/or bounce in the conveyor during operation.

SUMMARY

A windrower implement is provided. The windrower implement includes a frame extending along a central longitudinal axis between a forward end and a rearward end relative to a direction of travel during operation. An implement head is attached to the frame proximate the forward end thereof. The implement head is operable to discharge crop material in a rearward direction along the central longitudinal axis. A merger attachment is coupled to the frame rearward of the implement head. The merger attachment includes a support structure rotatably supporting a conveyor, and a lift structure interconnecting the support structure and the frame. The lift structure is moveable between a deployed position for positioning the support structure in a lowered operating position, and a stowed position for positioning the support structure in a raised non-operating position. The lift structure includes a link system coupled to the frame and a lift arm. The lift arm includes a first end attached to the link system and extends to a distal second end attached to the support structure. The lift structure includes a support connection interconnecting the lift arm and the support structure. The support connection maintains a relative position between the lift arm and the support structure during movement of the lift structure between the stowed position and the deployed position.

In one implementation of the disclosure, the support connection may be configured to enable pivotable movement of the support structure relative to the link arm about a substantially vertical swing axis such that the support structure may move relative to the link arm on a substantially horizontal plane for positional for/aft adjustment, while maintaining a fixed positional relationship between the link arm and the support structure on a substantially vertical plane passing through the central longitudinal axis of the frame.

In one implementation of the disclosure, the lift system may include a strut interconnecting the lift arm and the support structure. The strut may include an adjustable length. Adjustment of the length of the strut is operable to rotate the support structure about the swing axis of the support connection.

In one aspect of the disclosure, the link system positions the lift arm and the support structure at an inclined orientation angled upward toward the forward end of the frame along the central longitudinal axis of the fame when the link system is disposed in the stowed position.

In one aspect of the disclosure, the conveyor includes an upper surface having a forward upper edge and a rearward upper edge. The forward upper edge of the conveyor is positioned vertically above the rearward upper edge of the conveyor along the central longitudinal axis of the frame when the link system is disposed in the stowed position and the support structure disposed in the raised non-operating position. The forward upper edge of the conveyor is positioned vertically below the rearward upper edge of the conveyor along the central longitudinal axis of the frame when the link system is disposed in the deployed position and the support structure is disposed in the lowered operating position.

In one aspect of the disclosure, the merger attachment includes an actuator coupled to the link system. The actuator is operable to move the link system between the stowed position and the deployed position. In one implementation of the disclosure, the actuator may includes a linear actuator operable to extend and retract in response to a control signal. The linear actuator may include, but is not limited to, a hydraulic cylinder responsive to a hydraulic control signal to extend and retract, or an electric actuator responsive to an electrical control signal to extend and retract.

In one aspect of the disclosure, the link system includes a mounting bracket rigidly attached to the frame. The mounting bracket may be a separate component rigidly attached to the frame or may be integrally formed with and as a part of the frame. The link system further includes a rearward link interconnecting the mounting bracket and the lift arm, and a forward link interconnecting the mounting bracket and the lift arm. In one implementation, the forward link may include a first forward link disposed on a first lateral side of the lift arm and a second forward link disposed on a second lateral side of the lift arm.

In one aspect of the disclosure, the link system includes a first pivot connection defining a first pivot axis. The first pivot connection interconnects an upper end of the rearward link and the mounting bracket. The rearward link is pivotably moveable about the first pivot axis relative to the mounting bracket. The link system further includes a second pivot connection defining a second pivot axis. The second pivot connection interconnects an upper end of the forward link and the mounting bracket. The forward link is pivotably moveable about the second pivot axis relative to the mounting bracket. The link system further includes a third pivot connection defining a third pivot axis. The third pivot connection interconnects a lower end of the rearward link and the lift arm. The rearward link and the lift arm are both rotatably moveable relative to each other about the third pivot axis. The link system further includes a fourth pivot connection defining a fourth pivot axis. The fourth pivot connection interconnects a lower end of the forward link and the lift arm. The forward link and the lift arm are both rotatably moveable relative to each other about the fourth pivot axis.

In one aspect of the disclosure, the link system defines an upper separation distance between the first pivot axis and the second pivot axis, and a lower separation distance between the third pivot axis and the fourth pivot axis. The upper separation distance is greater than the lower separation distance. In one implementation, the upper separation distance may be at least five percent (5%) greater than the lower separation distance.

In one aspect of the disclosure, the link system defines a rearward separation distance between the first pivot axis and the third pivot axis, and a forward separation distance between the second pivot axis and the fourth pivot axis. The forward separation distance is greater than the rearward separation distance. In one implementation, the forward separation distance is at least five percent (5%) greater than the rearward separation distance.

In one aspect of the disclosure, the first pivot axis, the second pivot axis, the third pivot axis and the fourth pivot axis are all parallel with each other and extend substantially horizontally in a transverse direction relative to the central longitudinal axis of the frame.

In one aspect of the disclosure, the support connection includes a first mounting plate rigidly attached to the lift arm, and a second mounting plate rigidly attached to the support structure. The first mounting plate and the second mounting plate may be attached together via a plurality of fasteners.

Each of the first mounting plate and the second mounting plate may include a plurality of mounting apertures through which the plurality of fasteners pass through. A relative position between the first mounting plate and the second mounting plate is adjustable by using different combinations of the plurality of mounting apertures through which the plurality of fasteners extend. In one implementation of the disclosure, the plurality of mounting apertures in one of the first mounting plate and the second mounting plate are elongated to provide additional adjustment of the mounting support.

Accordingly, the link system of the merger attachment described herein positions the conveyor at an upward inclined angle when disposed in the stowed position to limit and reduce crop material from landing on the upper support surface of the conveyor when not in use. The link system further position the conveyor at a downward inclined angle when disposed in the deployed position to better position the upper support surface of the conveyor to receive the crop material from the implement head. Additionally, the orientation of the link system described herein shortens a length of the lift arm, thereby increasing stiffness and rigidity of the lift system and thereby reducing flex and bounce of the support structure during operation.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
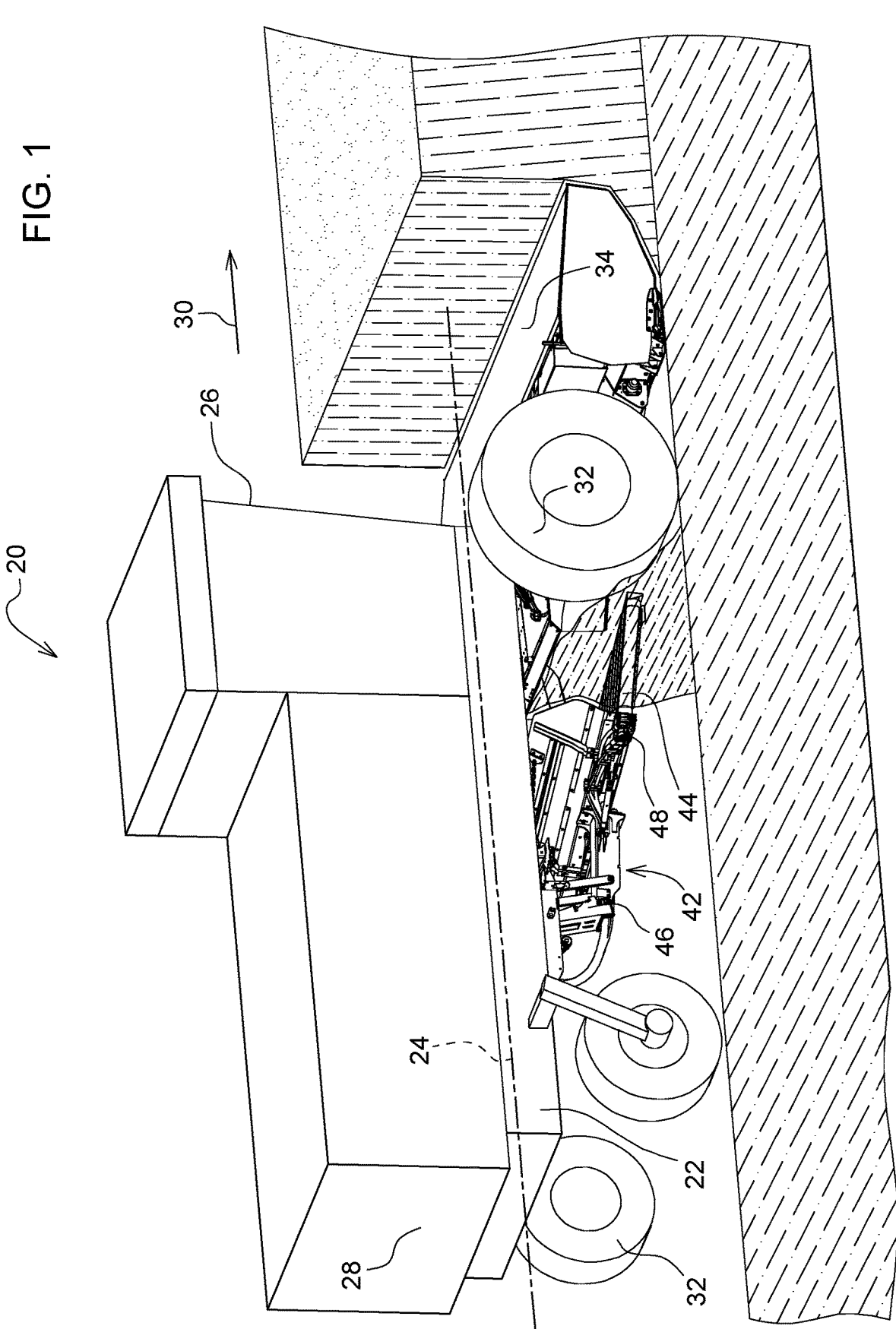
FIG. 1 is a schematic perspective view of a windrower implement.

Referring to the Figures, wherein like numerals indicate like parts throughout the several views, a windrower implement is generally shown at 20 in FIG. 1. The exemplary embodiment of the windrower implement 20 shown in the Figures is configured as a self-propelled windrower. However, it should be appreciated that the teachings of this disclosure may be applied to other platforms, such as but not limited to, a drawn implement configured for connection to a tractor. In one implementation, the windrower implement 20 is operable to mow and collect standing crop material in a field, condition the cut crop material as it moves through the windrower implement 20 to improve is drying characteristics, and then return the conditioned, cut crop material to the field in a windrow or swath.

Figure 2:
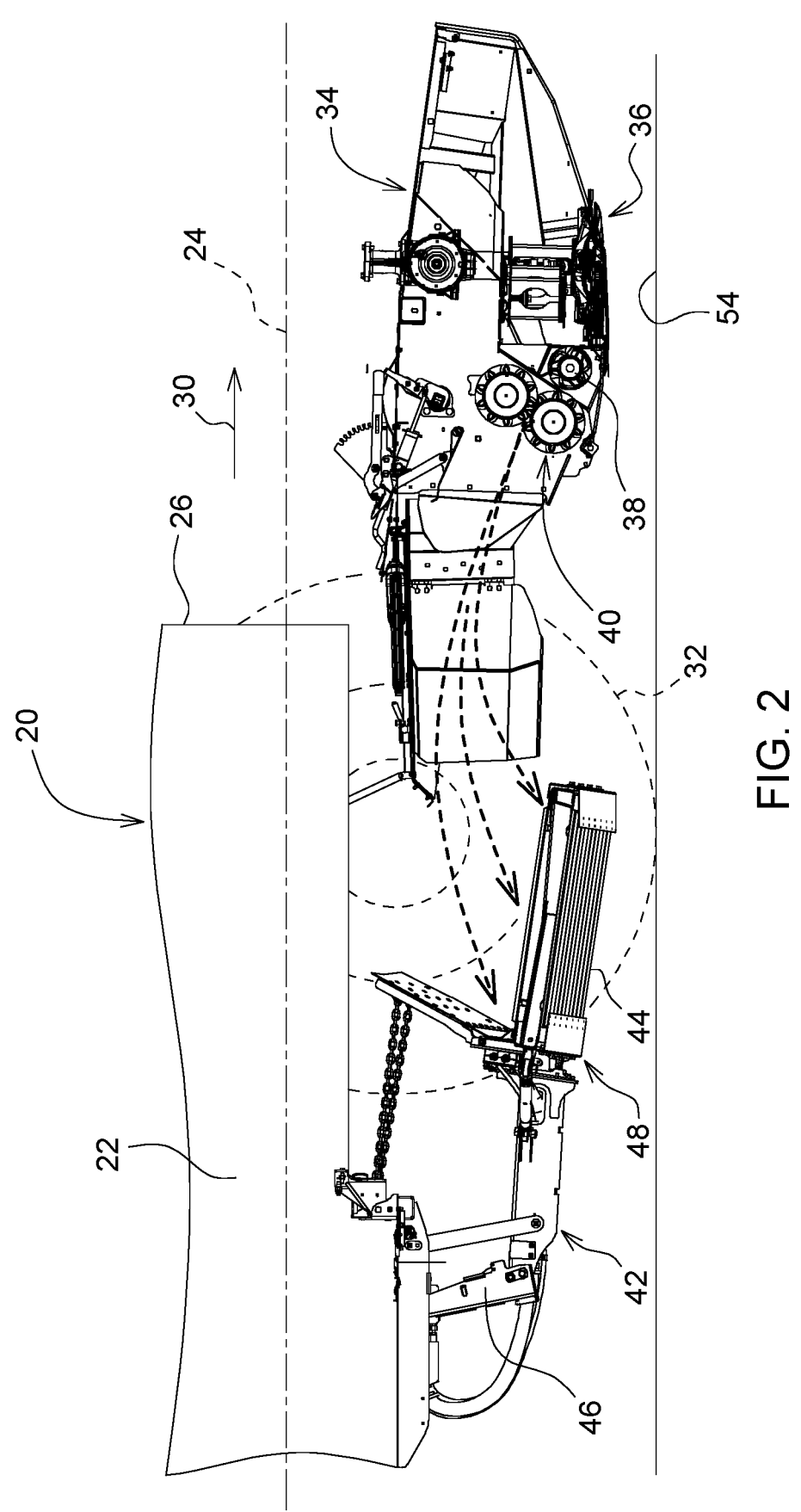
FIG. 2 is a schematic partial cross sectional side view of the windrower implement.

Referring to FIGS. 1-2, the example implementation of the windrower implement 20 includes a frame 22. The frame 22 extends along a central longitudinal axis 24 between a forward end 26 and a rearward end 28 relative to a direction of travel 30 during operation. The central longitudinal axis 24 defines a longitudinal centerline of the windrower implement 20. The frame 22 may include, but is not limited to, the various members, panels, supports, braces, beams, etc., necessary to support the various components and systems of the windrower implement 20 as described below. The windrower implement 20 includes ground engaging devices 32, e.g., tires and/or tracks, which support the frame 22 relative to a ground surface 54. The ground engaging devices 32 may be powered to move the windrower implement 20 across the ground surface 54.

The windrower implement 20 further includes an implement head 34. The implement head 34 is attached to the frame 22 proximate the forward end 26 of the frame 22. The implement head 34 is operable to discharge crop material in a rearward direction generally along the central longitudinal axis 24. In addition, the implement head 34 may further cut the crop material and condition the crop material to aid in dry down.

In one implementation, the implement head 34 may include, but is not limited to, a cutting mechanism 36. The cutting mechanism 36 is coupled to the frame 22 and is operable to cut standing crop material in a field. The cutting mechanism 36 may include any mechanism that is capable of cutting the crop material. For example, the cutting mechanism 36 may be embodied as a rotary disc cutter bar. However, the cutting mechanism 36 is not limited to the exemplary embodiment of the rotary disc cutter bar. As such, it should be appreciated that the cutting mechanism 36 may vary from the exemplary embodiment noted herein.

As understood in the art, the rotary disc cutter bar includes a cutter bar supported by the frame 22. The cutter bar extends along an axis that is disposed generally transverse to a direction of travel 30 of the windrower implement 20. The cutter bar includes a plurality of cutting discs spaced along the cutter bar for rotation about respective vertical axes. Each of the cutting discs is coupled to a drivetrain to which power is coupled for causing them to rotate in appropriate directions, for delivering cut crop material to an auger 38 disposed rearward of the cutting mechanism 36.

The auger 38 may pass the crop material rearward to a crop conditioning system 40. In particular, the auger 38 may be positioned in front of and lower than the crop conditioning system 40. In operation, the design of the auger 38 enables the delivery of cut crop material into the crop conditioning system 40. The cutting mechanism 36 delivers cut crop material to the auger 38, which in turn may delivers the cut crop material rearward for further processing by the crop conditioning system 40. The crop conditioning system 40 may include, but is not limited to, an impeller style conditioning system or a pair of counter rotating conditioner rolls, as is understood in the art. The conditioned crop material is expelled rearward by the crop conditioning system 40, and may be formed into the windrow or swath by upright right and left forming boards and a swath board. The cut and conditioned crop material is expelled or discharged from the crop conditioning system 40 in the rearward direction, whereafter the crop material moves a short distance through the air before accumulating on the ground in the formed windrow.

Referring to FIGS. 1-4, the windrower implement 20 includes a merger attachment 42. The merger attachment 42 is coupled to the frame 22 rearward of the implement head 34. The merger attachment 42 is moveable between a deployed position, shown in FIGS. 1-3, and a stowed position, shown in FIG. 4. When the merger attachment 42 is disposed in the deployed position, the merger attachment 42 is positioned relative to the implement head 34 to receive discharged crop material from the implement head 34 and convey the crop material laterally relative to the central longitudinal axis 24 to form the windrow laterally offset from the central longitudinal axis 24. When the merger attachment 42 is disposed in the stowed position, the merger attachment 42 is positioned relative to the implement head 34 to not receive discharged crop material from the implement head 34 to form the windrow substantially aligned with the central longitudinal axis 24 along the centerline of the windrower implement 20.

When disposed in the deployed position, the merger attachment 42 is positioned such that the crop material discharged from the crop conditioning system 40 falls on a conveyor 44 of the merger attachment 42 instead of the ground. The crop material discharged from the crop conditioning system 40 is disposed generally along a longitudinal centerline of the windrower implement 20, between left and right ground engaging devices 32 of the windrower implement 20. The conveyor 44 of the merger attachment 42 may include, for example, a rotatable endless belt, which is operable to convey the crop material laterally relative to the longitudinal centerline of the windrower implement 20, and deposit the crop material on the ground at a laterally offset position relative to the central longitudinal axis 24 of the frame 22 and the centerline of the windrower implement 20. The crop material is discharged from the implement head 34 and falls onto the conveyor 44 of the merger attachment 42. The conveyor 44 moves or rotates to move the crop disposed thereon laterally outward away from the centerline of the windrower implement 20. The crop on the conveyor 44 is deposited or discharged off a distal end of the conveyor 44, whereafter the crop falls to the ground forming the windrow which is laterally offset from the centerline of the windrower implement 20.

Referring to FIGS. 5-10, the merger attachment 42 may include a lift structure 46 and a support structure 48. The support structure 48 includes and rotatably supports the conveyor 44 for moving the crop material. The lift structure 46 interconnects the frame 22 of the windrower implement 20 and the support structure 48. The lift structure 46 is moveable between the stowed position and the deployed position. When the lift structure 46 is disposed in the stowed position, the lift structure 46 positions the support structure 48 in a raised non-operating position tightly against the belly of the frame 22, such that the conveyor 44 of the support structure 48 does not engage the cut crop material discharged from the implement head 34 and the windrow may be formed along the central longitudinal axis 24 of the frame 22, i.e., generally along the centerline of the windrower implement 20. When the lift structure 46 is disposed in the deployed position, the lift structure 46 may position the support structure 48 in a lowered operating position with the conveyor 44 of the support structure 48 near the ground surface 54, such that the crop material discharged from the implement head 34 falls on the conveyor 44 of the support structure 48 for lateral movement relative to the central longitudinal axis 24, whereby the windrow may be formed laterally offset form the central longitudinal axis 24.

The continuous conveyor 44 forms an endless loop encircling the support structure 48. As used herein, the term "conveyor 44", "continuous belt" or "belt" should be understood to include an endless loop of flexible construction extending between and encircling two rotating shafts, pulleys, or rolls and the support structure 48. It should be appreciated that the crop material discharged from the crop conditioning system 40 may fall on an upper surface 50 of the conveyor 44. The conveyor 44 is operable to rotate about the support structure 48 in a continuous, uninterrupted cyclical manner when engaged. The conveyor 44 may be manufactured from, but is not limited to, a single piece of material, or from multiple segments pinned or otherwise connected together. The material of the conveyor 44 may include, but is not limited to, a rubber or rubber like material, a polymer material, a reinforced polymer or rubber material, a metal material, etc.

Figure 5:
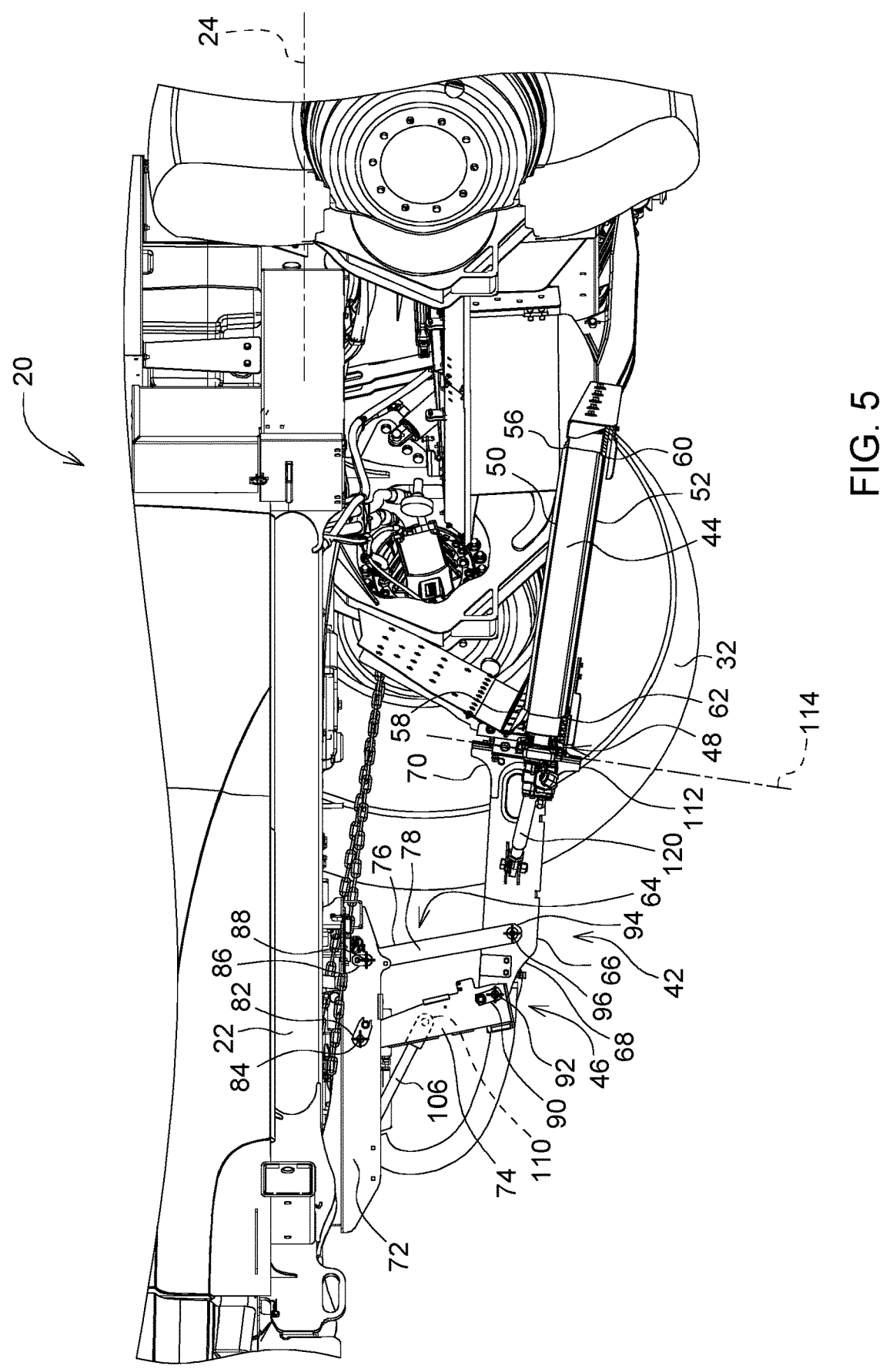
FIG. 5 is a schematic perspective view of the merger attachment in the deployed position.
Figure 6:
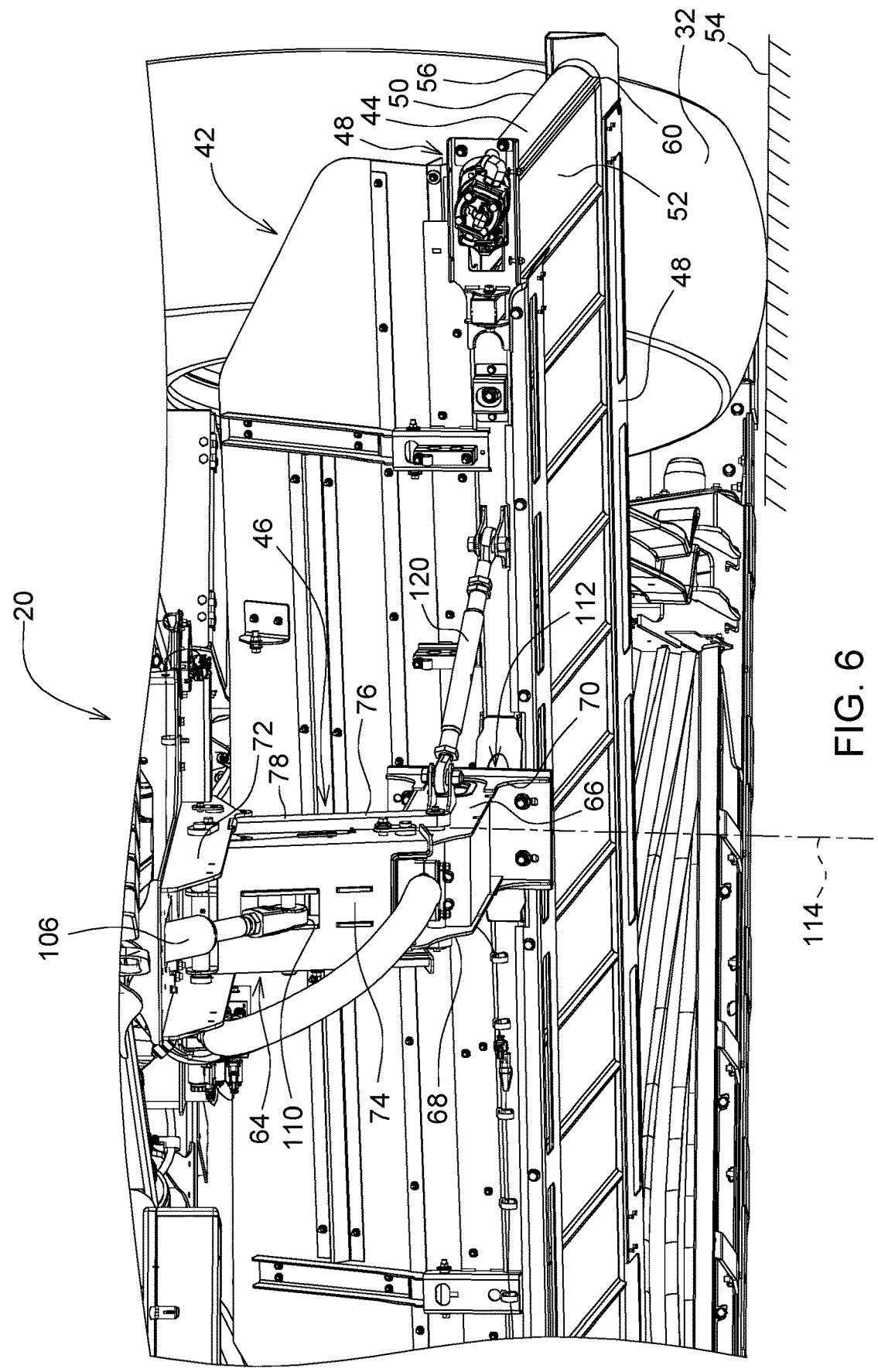
FIG. 6 is a schematic perspective view of the merger attachment from a rearward position looking forward.
Figure 8:
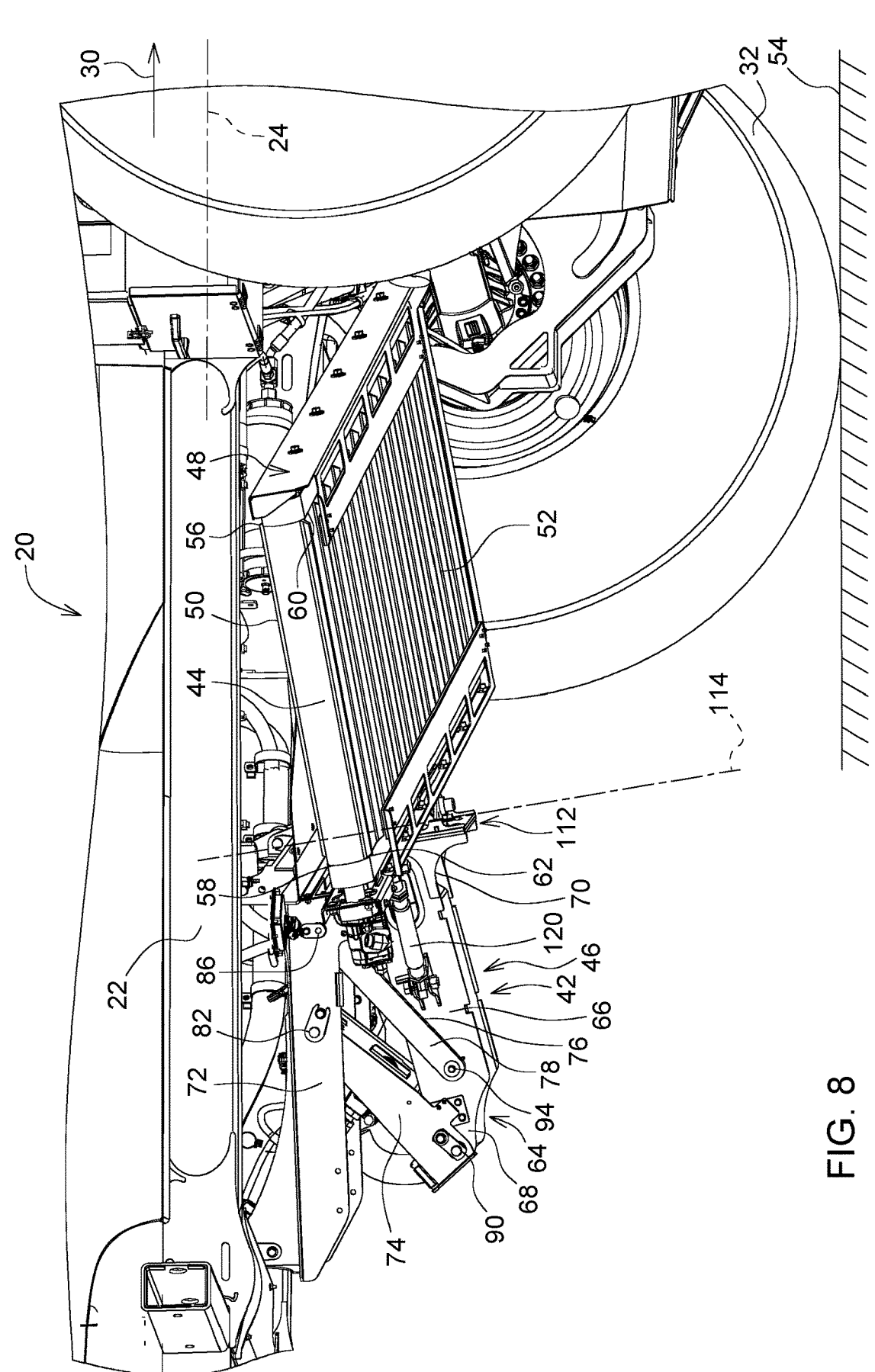
FIG. 8 is a schematic perspective view of the merger attachment in the stowed position.

Referring to FIGS. 5 and 8, the conveyor 44 includes the upper surface 50 and an opposing lower surface 52. The upper surface 50 is disposed vertically above the lower surface 52 relative to a ground surface 54. The upper surface 50 of the conveyor 44 further includes a forward upper edge 56 and a rearward upper edge 58. Similarly, the lower surface 52 of the conveyor 44 includes a forward lower edge 60 and a rearward lower edge 62. The forward upper edge 56 and the forward lower edge 60 of the conveyor 44 are defined by the edge of the endless belt of the conveyor 44 disposed nearer the forward end 26 of the frame 22. The rearward upper edge 58 and the rearward lower edge 62 of the conveyor 44 are defined by the edge of the endless belt of the conveyor 44 disposed nearer the rearward end 28 of the frame 22.

The forward upper edge 56 of the conveyor 44 is positioned vertically above the rearward upper edge 58 of the conveyor 44 along the central longitudinal axis 24 of the frame 22 when the link system 64 is disposed in the stowed position and the support structure 48 is disposed in the raised non-operating position. This orientation, with the forward upper edge 56 disposed higher than the rearward upper edge 58, positions the upper surface 50 of the conveyor 44 at an inclined orientation that is angled upward toward the forward end 26 of the frame 22. As such, the upper surface 50 of the conveyor 44 is not horizontal, but rather angles upward toward the forward upper edge 56. This positions the forward upper edge 56 of the conveyor 44 tight against the belly of the frame 22 and maximizes the distance between the lower surface 52 of the conveyor 44 and the ground surface 54 so that the crop material discharged from the implement head 34 falls on the ground surface 54 and not on the upper surface 50 of the conveyor 44 when the conveyor 44 is disposed in the stowed position, i.e., the raised non-operating position.

When the link system 64 is disposed in the deployed position and the support structure 48 is disposed in the lowered operating position, the forward upper edge 56 of the conveyor 44 is positioned vertically below the rearward upper edge 58 of the conveyor 44 along the central longitudinal axis 24 of the frame 22. This orientation, with the forward upper edge 56 disposed lower than the rearward upper edge 58, positions the upper surface 50 of the conveyor 44 at an inclined orientation that is angled downward toward the forward end 26 of the frame 22. As such, the upper surface 50 of the conveyor 44 is not horizontal, but rather angles downward toward the forward lower edge 60. This positions the forward upper edge 56 of the conveyor 44 near the ground surface 54 and minimizes the distance between the forward lower edge 60 of the conveyor 44 and the ground surface 54 so that the crop material discharged from the implement head 34 falls on the upper surface 50 of the conveyor 44 when the conveyor 44 is disposed in the deployed position, i.e., the lowered operating position.

Figure 7:
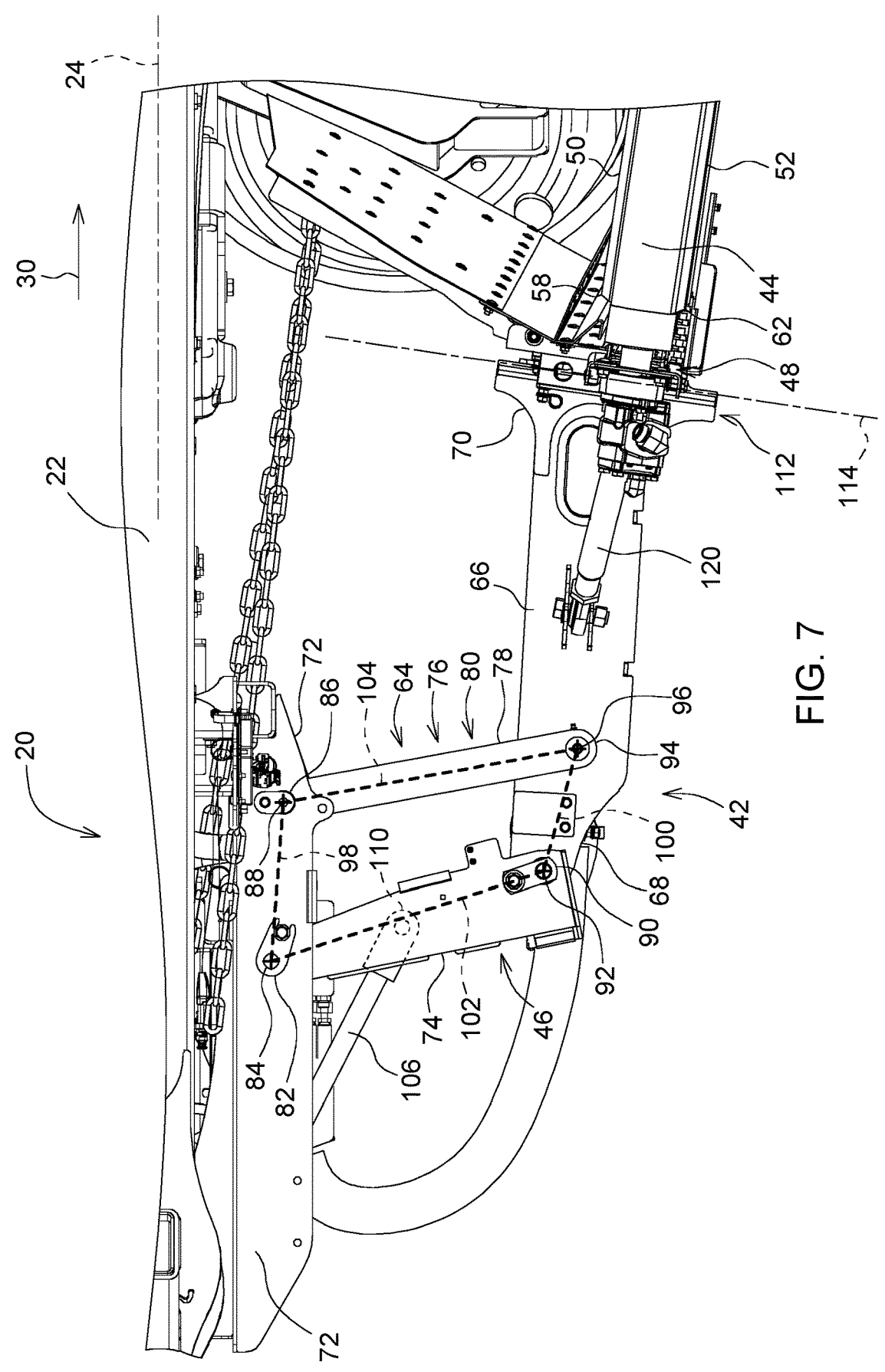
FIG. 7 is a schematic enlarged perspective view of a lift system of the merger attachment.

Referring to FIG. 7, the lift structure 46 includes a link system 64 and a lift arm 66. The link system 64 is coupled to the frame 22 and interconnects the frame 22 and the lift arm 66. The lift arm 66 includes a first end 68 that is attached to the link system 64. The lift arm 66 extends from the first end 68 thereof to a distal second end 70 that is attached to the support structure 48 to support the conveyor 44 in a cantilevered manner. As described above, the link system 64 positions the lift arm 66 and the support structure 48 at an inclined orientation angled upward toward the forward end 26 of the frame 22 along the central longitudinal axis 24 of the fame when the link system 64 is disposed in the stowed position, and positions the support structure 48 and the conveyor 44 at an inclined orientation angled downward toward the forward end 26 of the frame 22 along the central longitudinal axis 24 of the frame 22 when the link system 64 is disposed in the deployed position.

The link system 64 includes a mounting bracket 72, a rearward link 74, and a forward link 76. The mounting bracket 72 is rigidly attached to the frame 22. In one implementation, the mounting bracket 72 may be a separate component that is fixedly attached to the frame 22, for example, with a plurality of fasteners, an interlocking mechanical latch, etc. In other implementations, the mounting bracket 72 may be integral with and part of the frame 22. In other words, the frame 22 and the mounting bracket 72 may be one common component. The rearward link 74 interconnects the mounting bracket 72 and the lift arm 66. The forward link 76 also interconnects the mounting bracket 72 and the lift arm 66. The rearward link 74 is disposed nearer the rearward end 28 of the frame 22 than is the forward link 76. Similarly, the forward link 76 is disposed nearer the forward end 26 of the frame 22 than is the rearward link 74.

In one implementation, the forward link 76 may include a first forward link 78 disposed on a first lateral side of the lift arm 66 and a second forward link (not shown) disposed on a second lateral side of the lift arm 66. However, in other implementations, the forward link 76 may include a single component.

The link system 64 includes a first pivot connection 82. The first pivot connection 82 defines a first pivot axis 84. The first pivot axis 84 is substantially horizontal and transverse to the central longitudinal axis 24 of the frame 22. The first pivot connection 82 interconnects an upper end of the rearward link 74 and the mounting bracket 72. The rearward link 74 is pivotably moveable about the first pivot axis 84 relative to the mounting bracket 72. The first pivot connection 82 may be formed, for example, but is not limited to, one or more pins extending through and interconnecting the rearward link 74 and the mounting bracket 72.

The link system 64 includes a second pivot connection 86. The second pivot connection 86 defines a second pivot axis 88. The second pivot axis 88 is substantially horizontal and transverse to the central longitudinal axis 24 of the frame 22. The second pivot connection 86 interconnects an upper end of the forward link 76 and the mounting bracket 72. The forward link 76 is pivotably moveable about the second pivot axis 88 relative to the mounting bracket 72. The second pivot connection 86 may be formed, for example, but is not limited to, one or more pins extending through and interconnecting the forward link 76 and the mounting bracket 72.

The link system 64 includes a third pivot connection 90. The third pivot connection 90 defines a third pivot axis 92. The third pivot axis 92 is substantially horizontal and transverse to the central longitudinal axis 24 of the frame 22. The third pivot connection 90 interconnects a lower end of the rearward link 74 and the lift arm 66. Both the rearward link 74 and the lift arm 66 are rotatably moveable relative to each other about the third pivot axis 92. The third pivot connection 90 may be formed, for example, but is not limited to, one or more pins extending through and interconnecting the rearward link 74 and the lift arm 66.

The link system 64 includes a fourth pivot connection 94. The fourth pivot connection 94 defines a fourth pivot axis 96. The fourth pivot axis 96 is substantially horizontal and transverse to the central longitudinal axis 24 of the frame 22. The fourth pivot connection 94 interconnects a lower end of the forward link 76 and the lift arm 66. Both the forward link 76 and the lift arm 66 are rotatably moveable relative to each other about the fourth pivot axis 96. The fourth pivot connection 94 may be formed, for example, but is not limited to, one or more pins extending through and interconnecting the forward link 76 and the lift arm 66.

The first pivot axis 84, the second pivot axis 88, the third pivot axis 92 and the fourth pivot axis 96 are all parallel with each other and extend substantially horizontally in a transverse direction relative to the central longitudinal axis 24 of the frame 22.

The link system 64 defines an upper separation distance 98 between the first pivot axis 84 and the second pivot axis 88. The link system 64 further defines a lower separation distance 100 between the third pivot axis 92 and the fourth pivot axis 96. The upper separation distance 98 is greater than the lower separation distance 100. In one implementation, the upper separation distance 98 is at least five percent (5%) greater than the lower separation distance 100. For example, in one non-limiting implementation, the upper separation distance 98 may include a value of between 175 mm and 350 mm, such as but not limited to a value of approximately 260 mm, and the lower separation distance 100 may include a value of between 125 mm and 300 mm, such as but not limited to a value of approximately 210 mm.

The link system 64 defines a rearward separation distance 102 between the first pivot axis 84 and the third pivot axis 92. The link system 64 further defines a forward separation distance 104 between the second pivot axis 88 and the fourth pivot axis 96. The forward separation distance 104 is greater than the rearward separation distance 102. In one implementation, the forward separation distance 104 is at least five percent (5%) greater than the rearward separation distance 102. For example, in one non-limiting implementation, the forward separation distance 104 may include a value of between 400 mm and 580 mm, such as but not limited to a value of approximately 490 mm, and the rearward separation distance 102 may include a value of between 380 mm and 560 mm, such as but not limited to a value of approximately 470 mm.

Figure 3:
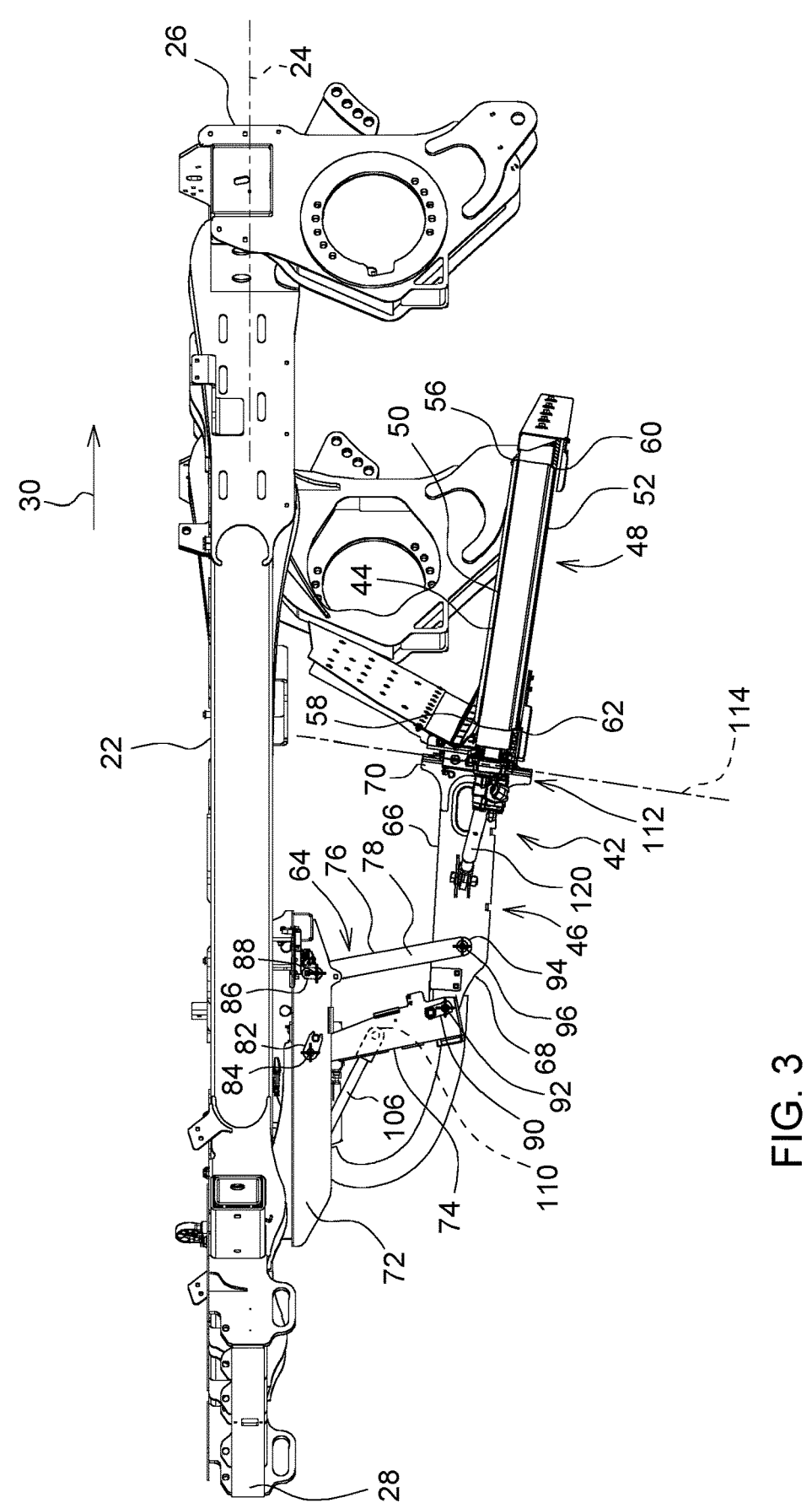
FIG. 3 is a schematic side view of the windrower implement showing a merger attachment in a deployed position.
Figure 4:
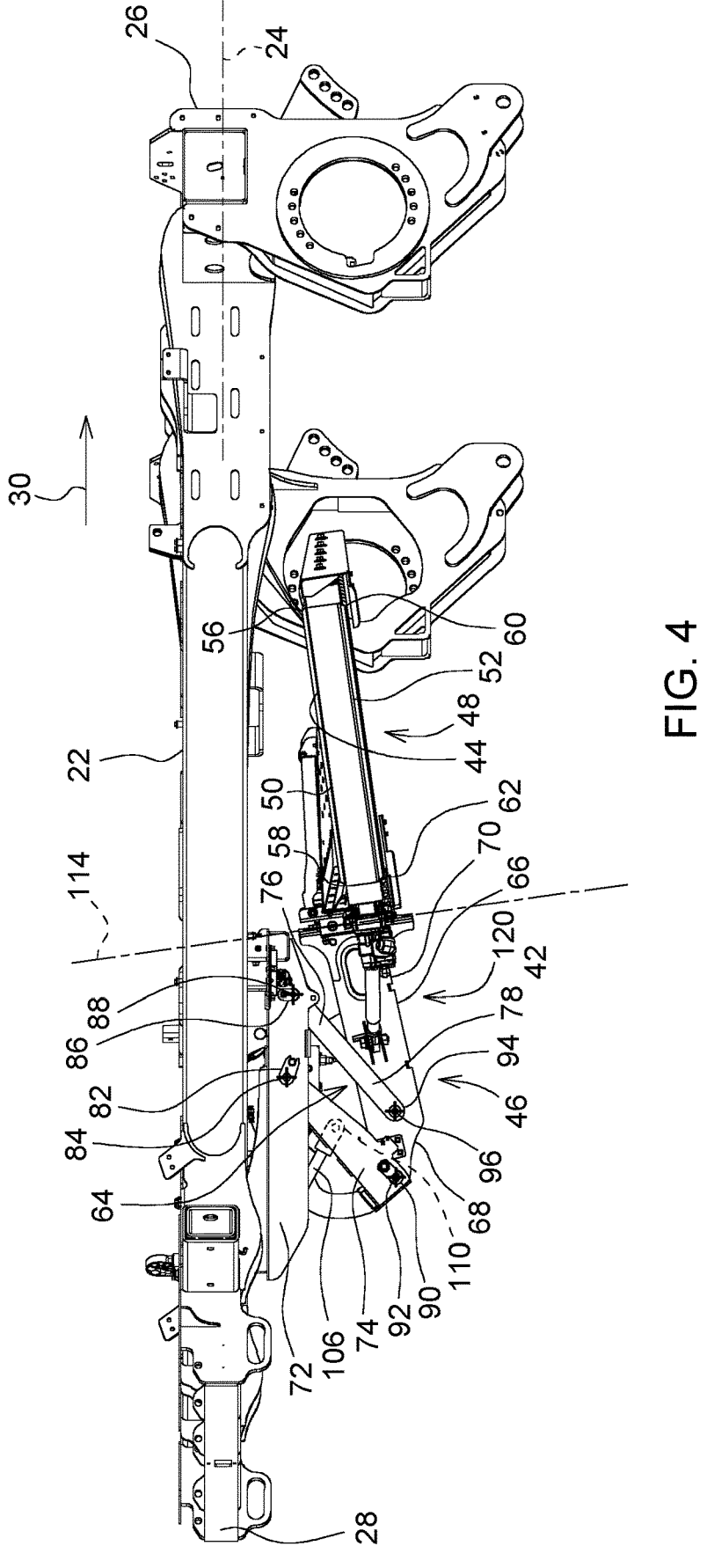
FIG. 4 is a schematic side view of the windrower implement showing the merger attachment in a stowed position.

Referring to FIGS. 3 and 4, the merger attachment 42 further includes an actuator 106. The actuator 106 is coupled to the link system 64. In one implementation, the actuator 106 includes a first end (not shown) coupled to the frame 22 and a second end 110 coupled to the rearward link 74 of the link system 64. The actuator 106 is operable to move the link system 64 between the stowed position and the deployed position. In one example implementation, the actuator 106 may include, but is not limited to, a linear actuator 106 operable to extend and retract in response to a control signal. The linear actuator 106 may include, but is not limited to, a hydraulic cylinder responsive to a hydraulic control signal to extend and retract, or an electric actuator 106 responsive to an electrical control signal to extend and retract. It should be appreciated that the actuator 106 may differ from the example implementations described herein, and may include a rotary actuator 106, linkages, levers, slides, connections, etc. necessary to move the link system 64 between the deployed position and the stowed position.

Figure 9:
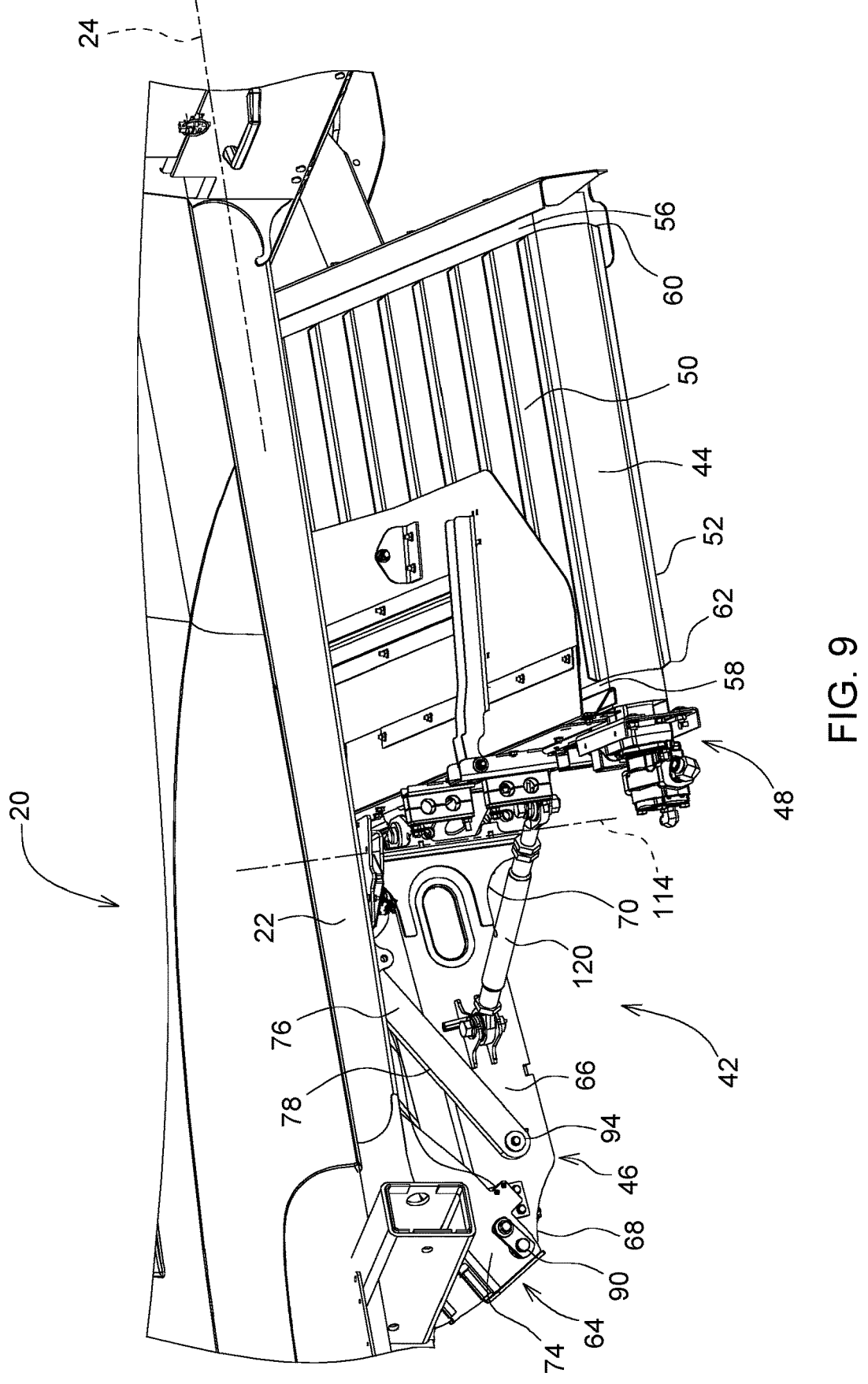
FIG. 9 is a schematic perspective view of the merger attachment.

Referring to FIG. 9, the lift structure 46 includes a support connection 112 interconnecting the lift arm 66 and the support structure 48. The support connection 112 maintains a relative position between the lift arm 66 and the support structure 48 during movement of the lift structure 46 between the stowed position and the deployed position. In one implementation, the support connection 112 may include a rotatable connection operable to enable pivotable movement of the support structure 48 relative to the link arm about a substantially vertical swing axis 114. As such, the support structure 48 may move relative to the link arm on a substantially horizontal plane for positional for/aft adjustment of the forward corners of the support structure 48, while maintaining a fixed positional relationship between the link arm and the support structure 48 on a substantially vertical plane passing through the central longitudinal axis 24 of the frame 22.

In one implementation of the disclosure, the lift system may include a strut 120 interconnecting the lift arm 66 and the support structure 48. The strut 120 may include an adjustable length. For example, the strut 120 may include, but is not limited to, a turnbuckle or other similar device operable to extend and retract. The changing the length of the strut 120 is operable to rotate the support structure 48 about the swing axis 114 of the support connection 112. Additionally, the strut 120 may provide support and resistance against rotational movement of the support structure 48 about the swing axis 114. As such, it should be appreciated that the length of the strut 120 may be adjusted to adjust or control the position of the support structure 48 about the swing axis 114 relative to the lift arm 66.

Figure 10:
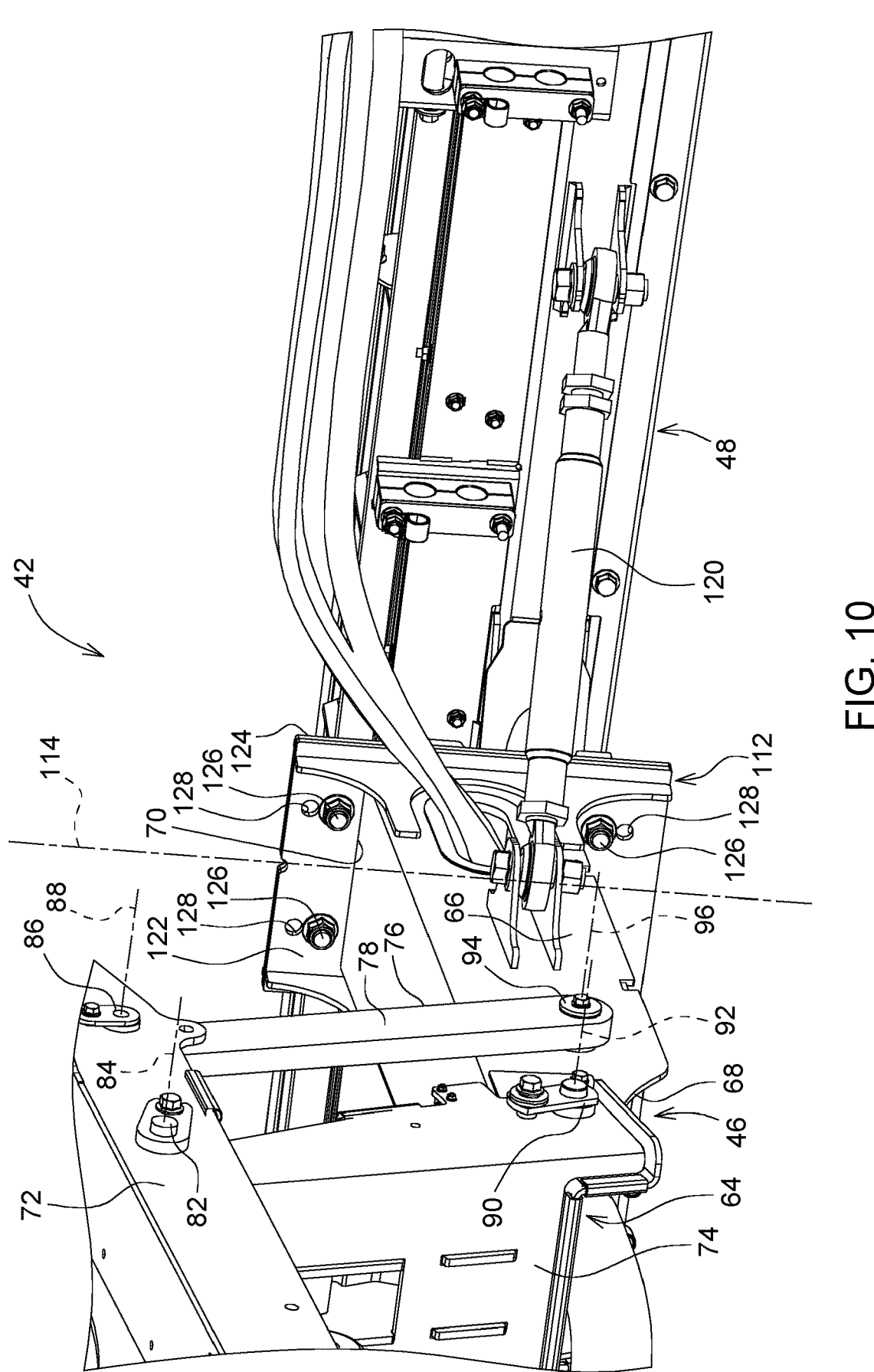
FIG. 10 is a schematic enlarged perspective view of a support connection of the merger attachment from the rearward position looking forward.
Figure 11:
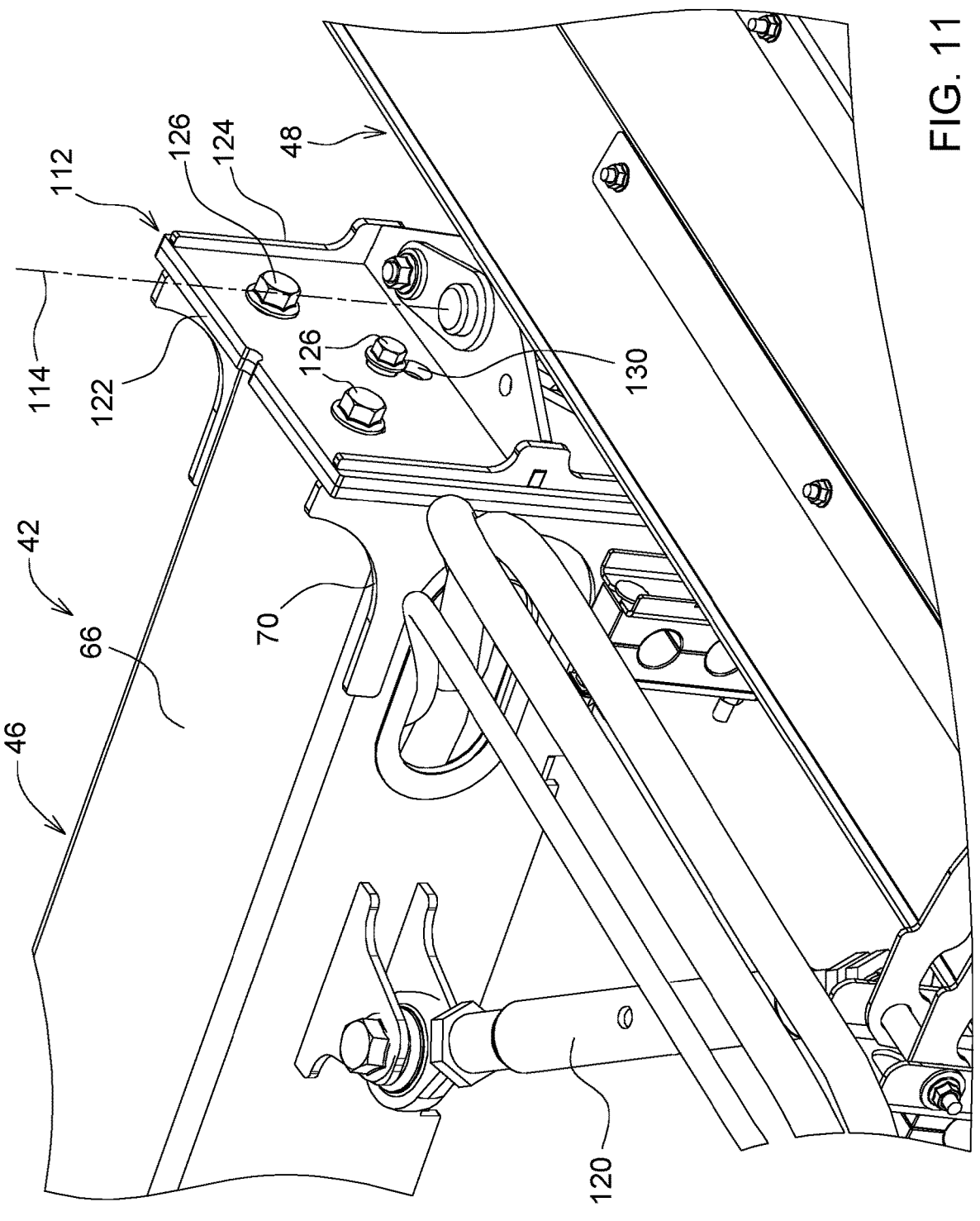
FIG. 11 is a schematic enlarged perspective view of the support connection of the merger attachment from a forward position looking rearward.

Referring to FIGS. 10 and 11, the support connection 112 may include a first mounting plate 122 and a second mounting plate 124. The first mounting plate 122 may be rigidly attached to the lift arm 66. The second mounting plate 124 may be rigidly attached to the support structure 48. The first mounting plate 122 and the second mounting plate 124 attached together via a plurality of fasteners 126 to secure the support structure 48 to the lift arm 66. In one implementation, each of the first mounting plate 122 and the second mounting plate 124 may include a plurality of mounting apertures 128 through which the plurality of fasteners 126 pass through. A relative position between the first mounting plate 122 and the second mounting plate 124 is adjustable by using different combinations of the plurality of mounting apertures 128 through which the fasteners 126 pass through. In one implementation, the plurality of mounting apertures 128 in one of the first mounting plate 122 and the second mounting plate 124 are oblong and/or elongated apertures 130 to provide additional adjustability to the positioning of the support structure 48 relative to the lift arm 66.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A windrower implement comprising:
a frame extending along a central longitudinal axis between a forward end and a rearward end relative to a direction of travel during operation;
an implement head attached to the frame proximate the forward end thereof, wherein the implement head is operable to discharge crop material in a rearward direction along the central longitudinal axis;
a merger attachment coupled to the frame rearward of the implement head, the merger attachment including a support structure rotatably supporting a conveyor, and a lift structure interconnecting the support structure and the frame, wherein the lift structure is moveable between a deployed position for positioning the support structure in a lowered operating position, and a stowed position for positioning the support structure in a raised non-operating position;
wherein the lift structure includes a link system coupled to the frame and a lift arm, the lift arm having a first end attached to the link system and extending to a distal second end attached to the support structure;
wherein the lift structure includes a support connection interconnecting the lift arm and the support structure, wherein the support connection maintains a relative position between the lift arm and the support structure during movement of the lift structure between the stowed position and the deployed position;
wherein the support connection is configured to enable pivotable movement of the support structure relative to the link arm about a substantially vertical swing axis such that the support structure may move relative to the link arm on a substantially horizontal plane for positional for/aft adjustment, while maintaining a fixed positional relationship between the link arm and the support structure on a substantially vertical plane passing through the central longitudinal axis of the frame;
wherein the lift system includes a strut interconnecting and operatively disposed between the lift arm and the support structure, wherein the strut includes an adjustable length operable to rotate the support structure about the substantially vertical swing axis of the support connection; and
wherein the conveyor includes an upper surface having a forward upper edge and a rearward upper edge, with the forward upper edge of the conveyor positioned vertically above the rearward upper edge of the conveyor along the central longitudinal axis of the frame when the link system is disposed in the stowed position and the support structure disposed in the raised non-operating position.

2. The windrower implement set forth in claim 1, wherein the forward upper edge of the conveyor is positioned vertically below the rearward upper edge of the conveyor along the central longitudinal axis of the frame when the link system is disposed in the deployed position and the support structure is disposed in the lowered operating position.

3. The windrower implement set forth in claim 1, further comprising an actuator coupled to the link system and operable to move the link system between the stowed position and the deployed position.

4. The windrower implement set forth in claim 3, wherein the actuator includes a linear actuator operable to extend and retract in response to a control signal.

5. The windrower implement set forth in claim 4, wherein the actuator includes a hydraulic cylinder.

6. The windrower implement set forth in claim 1, wherein the link system includes a mounting bracket rigidly attached to the frame, a rearward link interconnecting the mounting bracket and the lift arm, and a forward link interconnecting the mounting bracket and the lift arm.

7. The windrower implement set forth in claim 6, wherein the link system includes a first pivot connection defining a first pivot axis, wherein the first pivot connection interconnects an upper end of the rearward link and the mounting bracket, with the rearward link pivotably moveable about the first pivot axis relative to the mounting bracket.

8. The windrower implement set forth in claim 7, wherein the link system includes a second pivot connection defining a second pivot axis, wherein the second pivot connection interconnects an upper end of the forward link and the mounting bracket, with the forward link pivotably moveable about the second pivot axis relative to the mounting bracket.

9. The windrower implement set forth in claim 8, wherein the link system includes a third pivot connection defining a third pivot axis, wherein the third pivot connection interconnects a lower end of the rearward link and the lift arm, with the rearward link and the lift arm both rotatably moveable relative to each other about the third pivot axis.

10. The windrower implement set forth in claim 9, wherein the link system includes a fourth pivot connection defining a fourth pivot axis, wherein the fourth pivot connection interconnects a lower end of the forward link and the lift arm, with the forward link and the lift arm both rotatably moveable relative to each other about the fourth pivot axis.

11. The windrower implement set forth in claim 10, wherein the link system defines an upper separation distance between the first pivot axis and the second pivot axis, and a lower separation distance between the third pivot axis and the fourth pivot axis, and wherein the upper separation distance is greater than the lower separation distance.

12. The windrower implement set forth in claim 11, wherein the upper separation distance is at least five percent (5%) greater than the lower separation distance.

13. The windrower implement set forth in claim 10, wherein the link system defines a rearward separation distance between the first pivot axis and the third pivot axis, and a forward separation distance between the second pivot axis and the fourth pivot axis, and wherein the forward separation distance is greater than the rearward separation distance.

14. The windrower implement set forth in claim 13, wherein the forward separation distance is at least five percent (5%) greater than the rearward separation distance.

15. The windrower implement set forth in claim 10, wherein the first pivot axis, the second pivot axis, the third pivot axis and the fourth pivot axis are all parallel with each other and extend substantially horizontally in a transverse direction relative to the central longitudinal axis of the frame.

16. The windrower implement set forth in claim 1, wherein the support connection includes a first mounting plate rigidly attached to the lift arm, and a second mounting plate rigidly attached to the support structure, with the first mounting plate and the second mounting plate attached together via a plurality of fasteners.

17. The windrower implement set forth in claim 16, wherein each of the first mounting plate and the second mounting plate include a plurality of mounting apertures through which the plurality of fasteners pass through, wherein a relative position between the first mounting plate and the second mounting plate is adjustable by using different combinations of the plurality of mounting apertures.

18. The windrower implement set forth in claim 17, wherein the plurality of mounting apertures in one of the first mounting plate and the second mounting plate are elongated.

* * * * *